April 18, 1961 J. F. RINGELMAN 2,980,846

IMPEDANCE CONTROLLED MAGNETIC AMPLIFIER

Filed May 31, 1956

WITNESSES

Edwin E. Baader

Wm. B. Sellers

INVENTOR

John F. Ringelman

BY

ATTORNEY 2,980,846

IMPEDANCE CONTROLLED MAGNETIC AMPLIFIER

John F. Ringelman, Catonsville, Md., assignor to Westinghouse Electric Corporation, East Pittsburgh, Pa., a corporation of Pennsylvania Filed May 31, 1956, Ser. No. 588,442

1 Claim. (Cl. 323—89)

This invention relates to magnetic amplifiers of the type in which a saturable magnetic core member is driven toward saturation in different directions on alternate half cycles of an applied alternating-current signal. More specifically, it relates to means for controlling the output of such magnetic amplifiers.

In a copending application Serial No. 587,538, filed May 28, 1956, now abandoned, and assigned to the assignee of the present application, there is described a novel type of self-saturating magnetic amplifier which is controlled by means of a variable impedance, saturable reactor included in its control circuit. In the amplifier described in the aforesaid application, the time during which a reset voltage is applied to the saturable magnetic core of the self-saturating magnetic amplifier is a function of the time at which the reactor in the control circuit of the amplifier saturates, and this in turn is a function of a direct-current control voltage applied to the reactor.

Although the circuit described in the aforesaid application will operate satisfactorily for its intended function, it has certain inherent disadvantages which result in non-linearity between the input control voltage applied to the amplifier and its output voltage It is a primary object of this invention to provide a new and improved impedance controlled magnetic amplifier which overcomes imperfections existing in similar prior art devices.

More specifically, an object of the invention resides in the provision of an impedance controlled self-saturating magnetic amplifier in which input control voltage and output voltage vary linearly over a wide range with repect to each other.

A still further object of the invention is to provide means in an impedance controlled self-saturating magnetic amplifier to decrease the transient time interval between the instant at which a control voltage is applied to the amplifier and steady state operating conditions.

As will become apparent from the following description, the magnetic amplifier of the present invention makes use of a high remanance, saturable core member having wound thereon a control winding and a load winding. An alternating voltage source is coupled to these windings by means of rectifiers which are poled so that on first alternate half-cycles of the alternating voltage, voltage is applied to the load winding to drive the magnetization level of the reactor toward saturation, and on second alternate half-cycles of the alternating voltage, a voltage is applied to the control winding to "reset" or withdraw the magnetization level of the reactor from saturation. The secondary winding of a saturable reactor is connected in series with the alternating voltage source and the control winding. By applying a direct-current input voltage to the primary winding of this saturable reactor, the magnetization level set by the control winding on reset half-cycles of operation may be controlled. After the saturable core has become saturated during the half-cycle of voltage application to the load winding, the impedance presented thereby will drop from a very high value to a very low value and the voltage across the load impedance connected in series with the load winding will rise sharply to substantially the same voltage as that of the alternating voltage source. The time interval of voltage developed across the load impedance, therefore, will be determined by the magnetization level set in the core during the half-cycle of voltage application to the control winding. Inasmuch as this magnetization level is a function of the input voltage applied to the saturable reactor in series with the control winding, the time interval of voltage developed across the load impedance will be functionally related to the input voltage applied to the reactor.

Ideally, the output voltage from the impedance controlled magnetic amplifier will vary linearly with respect to input voltage. Actually, however, non-linearity between input and output voltages in an impedance controlled magnetic amplifier occurs as a result of spurious currents in the control circuit of the amplifier which arise between successive "reset" half-cycles due to the transformer action of the various inductive elements incorporated into the circuit. By employing a transistor switching device in the control circuit, the control circuit is effectively opened during the half-cycle between successive "reset" half-cycles to thereby prevent spurious currents and render the output from the amplifier linear with respect to input voltage. In addition, the transient time interval between the instant at which a control voltage is applied to the amplifier and steady state operating conditions is greatly reduced by inclusion of the aforesaid transistor switching device.

The above and other objects and features of the invention will become readily apparent from the following detailed description taken in connection with the accompanying drawings which form a part of this specification and in which.

In all of the drawings, the manner in which the primary and secondary windings of the transformers are wound on their associated cores is indicated by dots which represent points of like instantaneous polarity. Thus, if the dots are on the same end of the transformer core, the windings are wound around the core in the same direction; whereas, if the dots are on opposite ends of the core, the windings are wound in opposite directions.

Figure 1:
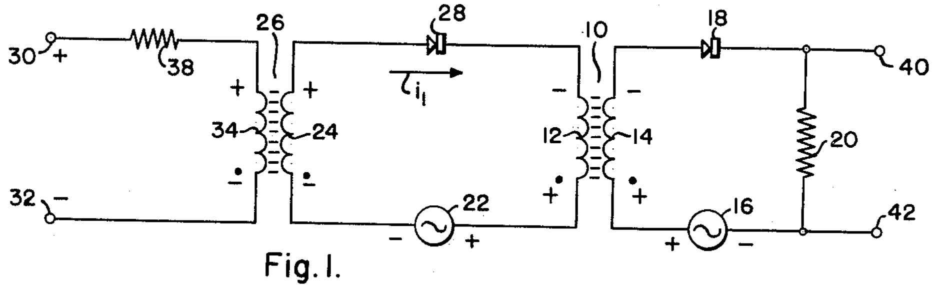
Figure 1 is a schematic circuit diagram of an impedance controlled half-wave, self-saturating magnetic amplifier.

Referring to Fig. 1, there is shown a basic half-wave, self-saturating magnetic amplifier employing a saturable core reactor 10 having primary and secondary windings 12 and 14, respectively. Between the opposite terminals of secondary winding 14 are connected, in series, a source of alternating voltage 16, a rectifier 18 and a load impedance 20. In a similar manner, alternating voltage source 22, primary winding 24 of a second saturable reactor 26 and rectifier 28 are connected in serise between the opposite terminals of primary winding 12. A source of control voltage, not shown, is applied to input terminals 30 and 32 and applied to primary winding 34 of reactor 26 via resistor 38. Output signals from the circuit are taken from terminals 40 and 42.

In order to have a full understanding of the operation of the amplifier, an examination of the induced voltage equation for reactors 10 and 26 should be made. This equation is:

$$B=\frac{k}{NA}\int edt$$

where $B$=flux density of the core in webers per square unit of area;
$k$=constant determined by the core material;
$N$=number of turns of wire in the winding of the inductor;
$A$=cross-sectional area of the core of the inductor;
$e$=instantaneous voltage; and
$t$=time in seconds.

When a reactor has a core formed from rectangular hysteresis loop material, as in the present case, it will saturate and present a very low impedance when the flux density B reaches a predetermined value. It can be readily seen that the saturation level of flux density is a function of both the applied voltage and also the time interval during which that voltage is applied to the reactor.

Voltage sources 16 and 22 are in phase, but have their output terminals reversed as shown by the polarity markings in Fig. 1. Consequently, since rectifiers 18 and 28 are poled to conduct in the same direction, rectifier 18 will conduct during one half-cycle of the applied voltage sources, while rectifier 28 will conduct on the other half cycle. When the polarity of the voltage sources is as shown in Fig. 1, rectifier 18 will conduct, and initially almost all of the voltage will appear across winding 14 of reactor 10 which is as yet unsaturated. After a given time interval, the reactor 10 will saturate; and, consequently, the voltage from source 16 will appear across impedance 20 to produce an output voltage. During the next half-cycle rectifier 28 will conduct and will apply a voltage across primary winding 12 to drive reactor 10 from saturation to a condition of unsaturation. That is, it will "reset" the reactor to a particular unsaturated magnetization level. In accordance with the induced voltage equation given above, the magnetization level reached during the reset half-cycle will depend upon the time interval during which the voltage source 22 is applied across winding 12. This time interval may be controlled in accordance with the present invention by means of reactor 26 which functions in much the same way as reactor 10. In the latter case, however, the reset magnetization level of the reactor 26 is controlled by the control voltage applied to terminals 30 and 32. By increasing the control voltage, the reactor 26 can be driven further from saturation during each cycle of operation and, consequently, will saturate at a later period during the half-cycle when rectifier 28 conducts. This in turn will reduce the unsaturated magnetization level to which reactor 10 is driven during the time that rectifier 28 conducts, and, consequently, the reactor 10 will saturate sooner during the half-cycle that rectifier 18 conducts to produce a greater average output voltage. It can thus be seen that the average value of the output voltage appearing across terminals 40 and 42 is directly proportional to the magnitude of the input voltage applied to terminals 30 and 32, the greater the input voltage, the greater the average output voltage.

During the half-cycle of voltage source 22 when reactor 26 is being reset to an unsaturated magnetization level, the extent of reset depends not only upon the input voltage applied to terminals 30 and 32 but also upon voltages in the control circuit containing current $i_1$. In the amplifier shown in Fig. 1, the voltages in the control circuit are distinctly different in two periods of time during the reset half-cycle of reactor 26. During the first portion of the half-cycle during which reactor 26 is reset, reactor 10 will be unsaturated and a voltage will appear across winding 12 since rectifier 18 is now conducting. This voltage is equal and opposite to the voltage of source 22. Thus, the voltage from source 22 and that across winding 12 effectively cancel each other, and the input voltage applied to terminals 30 and 32 induces a voltage across winding 24, resulting in current flow $i_1$ through rectifier 28.

The second portion of the reset half cycle of reactor 26 begins when reactor 10 saturates and the voltage across winding 12 drops to zero. At this time, the voltage from source 22 is no longer cancelled by a voltage across winding 12. Consequently, it opposes the voltage appearing across winding 24 and tends to force current $i_1$ to zero. After the current $i_1$ is forced to zero, reactor 26 is no longer loaded by the current $i_1$, and flux reset proceeds at a faster rate.

Figure 4:
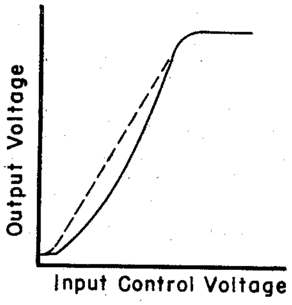
Fig. 4 is a graphical illustration of the operation of the circuits shown in Figs. 1–3.

Thus, during the first portion of the reset half cycle of reactor 26, current $i_1$ partially loads reactor 26 preventing proper reset. In the second portion of the half cycle, reset takes place normally. The control characteristic of the amplifier is thus a function of the firing angle of reactor 10 as well as the input voltage applied to terminals 30 and 32. A pronounced non-linearity between input and output voltages results similar to that shown by the solid line curve shown in Fig. 4.

Another disadvantage of the circuit shown in Fig. 1 is due to the relatively long time delay between the instant at which a control voltage is applied to input terminals 30 and 32 and steady state operating conditions. If it is assumed that the amplifier has been operating with no input signal applied to terminals 30 and 32 and a step input signal is then applied at the beginning of a reset half-cycle of the reactor 26, qualitatively, the following transient will result. At the instant that the control voltage is applied to terminals 30 and 32, reactor 10 will be at negative saturation and beginning to proceed toward positive saturation under the influence of voltage source 16. During the entire first half cycle, a voltage will appear across winding 12 of reactor 10. In addition, the voltage across the secondary winding 24 of reactor 26 due to the input voltage applied to terminals 30 and 32 will cause current $i_1$ to flow during all of the first half-cycle. Since reactor 26 was reset to some degree during this first half-cycle, the reset voltage will be applied to reactor 10 in the second half cycle. In the third half cycle, reactor 26 will again be reset by the control voltage applied to input terminals 30 and 32. During the first portion of this third half cycle, a voltage will appear across winding 12 of reactor 10 and the voltage across winding 24 of reactor 26 will cause current $i_1$ to flow. In this half-cycle, however, reactor 10 will saturate before the end of the half-cycle. Upon saturation of reactor 10, the voltage across winding 12 goes to zero, and the voltage from source 22 will prevent the induced voltage across winding 24 from causing current $i_1$ to flow. Since current $i_1$ flows during only a portion of the third half cycle (second reset half-cycle of reactor 26) the input voltage applied to terminals 30 and 32 will reset reactor 26 to a lower magnetization level than it did in the first half cycle. Thus, in the fourth half cycle, reactor 10 will be reset even less than in the second and its firing angle in the fifth half-cycle will be less. As a result of this action, current $i_1$ will flow for a shorter time in the fifth half-cycle than in the third resulting in reactor 26 being reset to a lower magnetization level. The difference in reset of reactor 26 between the third half-cycle and the fifth is less, however, than that between the first and third half-cycles. Similarly, this difference will become less and less in succeeding odd half-cycles as the transient progresses toward the steady state condition. It can be seen therefore, that the amplifier will require several half-cycles to reach a steady state.

Figure 2:
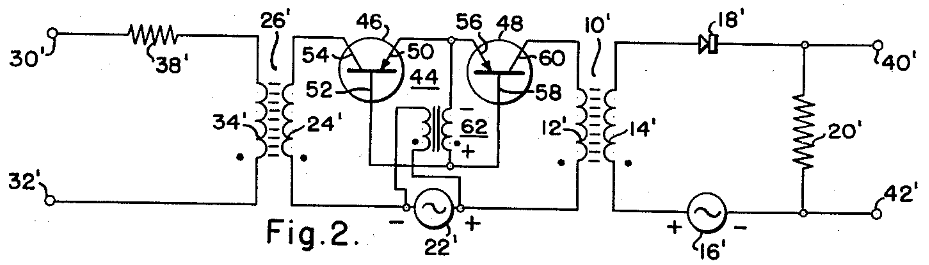
Fig. 2 is a schematic circuit diagram for an impedance controlled half-wave, self-saturating magnetic amplifier employing a double transistor switching device in its control circuit to provide linearity between input and output voltages and to reduce the time delay to the amplifier.

In the circuit of Fig. 2, non-linearity between the input and output voltages is corrected and the reset time of the control reactor 26 of the half-wave amplifier is independent of the firing angle of reactor 10. The circuit is substantially the same as that shown in Fig. 1 except for the substitution of a transistor switching device, generally indicated at 44, for rectifier 28 in the control circuit of Fig. 1. All other elements of the circuit of Fig. 2 are the same as those of Fig. 1 and, accordingly, are indicated by corresponding primed reference numerals. In the particular embodiment of the invention shown, transistor switch device 44 comprises two P–N–P transistors 46 and 48. Transistor 46 has an emitter electrode 50, base electrode 52 and collector electrode 54. Likewise, transistor 48 has an emitter electrode 56, a base electrode 58 and a collector electrode 60. In accordance with the present invention, the emitters 50 and 56 of the transistors 46 and 48 are interconnected and their junction is connected through the secondary winding of transformer 62 to the bases 52 and 58 of the respective transistors. The free ends of the collectors 54 and 60 define respectively the terminals of the switch device 44. The primary winding of transformer 62 is connected across the output terminals of voltage source 22′, substantially as shown.

For a full and detailed description of the operation and characteristics of the switching device 44, reference may be had to copending application Serial No. 438,060, filed June 21, 1954. In that application it may be seen that if a biasing potential applied between the emitter and base of a junction transistor is of a sufficient magnitude, the transistor will become "saturated" which means that a further increase in the magnitude of the forward current between the base and emitter electrodes has a negligible effect upon the magnitude of current flowing between the emitter and collector electrodes. For this condition, the resistance between the emitter and collector electrodes is of a relatively small value. In this case, since the transistors are of the P–N–P type, their bases must be biased negatively with respect to their emitters in order to initiate conduction. When this negative bias reaches a predetermined magnitude, the transistors will become saturated.

On the other hand if the bases of the P–N–P transistors are biased positively with respect to their emitters to a predetermined magnitude, the transistors will be "cut off" which means that a further increase in the magnitude of the reverse voltage between the base and the emitter electrodes is ineffective to further decrease current conduction between the emitter and collector electrodes. For this condition, the resistance between the emitter and collector electrodes is of a relatively large value and, effectively, will prevent current flow through the transistors. Thus, the transistors act as a switching device. When bases 52 and 58 are negative relative to emitters 50 and 56, the transistors will conduct and the switch will be closed. When the bases are biased positive relative to their associated emitters, the switch will be opened to prevent current flow. It can be seen from Fig. 2 that when the polarity of voltage source 22′ is as shown, bases 52 and 58 will be biased positive with respect to emitters 50 and 56 and the transistors 46 and 48 will not conduct. During this half cycle, rectifier 18′ will conduct to produce an output voltage across impedance 20′, the average value of which depends upon the firing angle of reactor 10′. When the polarity of the voltage source 22′ is reversed with respect to that shown in Fig. 2, bases 52 and 58 will be biased negatively with respect to their associated emitters and, consequently, transistors 46 and 48 will conduct to drive reactor 10′ to an unsaturated magnetization level.

Since the control circuit of the half-wave amplifier is effectively open-circuited during the reset half cycle of reactor 26′, the current $i_1$ cannot flow through the control circuit of Fig. 2. Consequently, the output voltage from the amplifier will now vary linearly with respect to the input voltage applied to terminals 30′ and 32′ as shown by the broken line in the graph of Fig. 4. In addition, the amplifier will have a one cycle response since the transient conditions prior to steady state conditions cannot now occur, owing to the fact that current $i_1$ is prevented from flowing.

Figure 3:
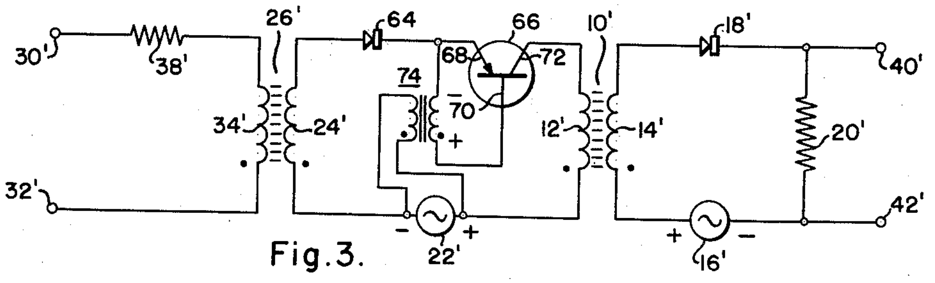
Fig. 3 is a schematic circuit diagram similar to that of Fig. 2 but employing a single, rather than a double transistor switching device.

In Fig. 3 a still further embodiment of the invention is shown which is similar to that of Fig. 1 except that the rectifier 28 is now replaced by the combination of a rectifier 64 and a transistor 66 which in this case is again a P–N–P junction transistor having an emitter 68, a base 70 and collector 72. As in Fig. 2, the output voltage from source 22′ is coupled between the emitter and base of transistor 66 by means of transformer 74.

In this embodiment of the invention, the rectifier 64 serves the same function as rectifier 28 in Fig. 1, but transistor 66 prevents current $i_1$ from flowing in the control circuit during half cycles when voltage source 22′ is of the polarity shown in Fig. 3. When the polarity of the output voltage from the source 22′ is as shown, base 70 will be positive relative to emitter 68 and, therefore, transistor 66 will be cut off to prevent current from flowing in the control circuit. On the next half cycle, however, base 70 will be biased negatively with respect to emitter 68 and the transistor 66 will be "saturated" to permit current to flow through rectifier 64 and primary winding 12′ to reset reactor 10′ to an unsaturated voltage level. In this case, since the current $i_1$ cannot flow during half cycles when voltage source 22′ is of the polarity shown in Fig. 3, the output characteristic of the amplifier will again be linear as shown by the dotted line in Fig. 4 and the time delay of the amplifier will be limited to one cycle.

Although the invention has been described in connection with certain specific embodiments, it should be readily apparent to those skilled in the art that various changes in form and arrangement of parts may be made to suit requirements without departing from the spirit and scope of the invention.

I claim as my invention:

A magnetic amplifier comprising a saturable magnetic core having an output winding and a reset winding inductively coupled therewith, an output current path including said output winding, a load impedance and means for generating current in said current path only during spaced signal intervals for saturating said core, the spacing of said signal intervals defining reset intervals, another saturable magnetic core having an input winding and a control winding inductively coupled therewith, a reset current path including said reset winding, said control winding, generator means for generating current in said reset current path during said reset intervals for resetting said magnetic core, and a pair of transistors having at least a base, a collector, an emitter electrode, with the collector and emitter electrodes thereof connected in series with said reset and control windings and said generator means, and means responsive to said generator means to render said transistors non conductive during said signal intervals.

References Cited in the file of this patent

UNITED STATES PATENTS

| | | |
|---|---|---|
| 2,740,086 | Evans et al. | Mar. 27, 1956 |
| 2,759,142 | Hamilton | Aug. 14, 1956 |
| 2,773,132 | Bright | Dec. 4, 1956 |
| 2,794,173 | Ramey | May 28, 1957 |
| 2,798,904 | Alexanderson | July 9, 1957 |
| 2,809,241 | Weissman | Oct. 8, 1957 |
| 2,859,289 | House | Nov. 4, 1958 |

OTHER REFERENCES

Pittman: Radio-Electronic Engineering, February 1954, pages 13–15.

Bell System Technical Journal, July 1954—"Transistors and Junction Diodes in Telephone Power Plants" by F. H. Chase, B. H. Hamilton, and D. H. Smith, pp. 827 and 847–858. (Particularly Fig. 16, Fig. 17 and Fig. 18.)